3,196,175
PROCESS OF PRODUCING α-CHLOROGLUTARIC ACID
Ryoichi Wakasa, Kazuo Saotome, and Tosiaki Yamazaki, Tokyo, Japan, assignors to Asahi Kasei Kogyo Kabushiki Kaisha, Osaka, Japan, a corporation of Japan
No Drawing. Filed Aug. 14, 1962, Ser. No. 216,715
Claims priority, application Japan, Aug. 15, 1961, 36/28,880
1 Claim. (Cl. 260—537)

This invention relates to a process for producing α-chloroglutaric acid, starting from 1,1,1,5-tetrachloropentane.

α-Chloroglutaric acid is an intermediate for the synthesis of glutamic acid which is adapted for use as condiments. It is well known that α-chloroglutaric acid readily yields DL-glutamic acid through amination with ammonia.

An object of the invention is to provide a novel process for the production of α-chloroglutaric acid with commercial advantage, starting from 1,1,1,5-tetrachloropentane. Other objects will be apparent from the following description.

Heretofore, the synthesis of 1,1,1,5-tetrachloropentane has been very difficult. But, this compound is readily synthesized by telomerization of ethylene and carbon tetrachloride.

According to the invention, α-chloroglutaric acid is produced in a high yield, by the following equations starting from this compound.

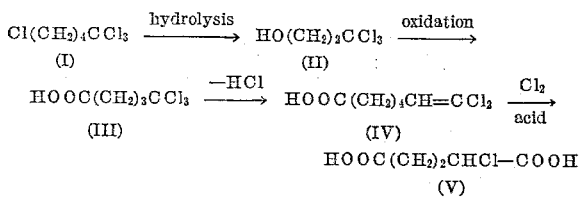
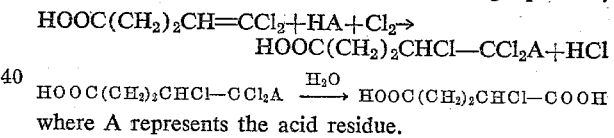

As obvious from the above formula, the process of the invention comprises four steps of reactions. In the first step, 1,1,1,5-tetrachloropentane (I) is heated with an aqueous alkaline solution, such as sodium hydroxide or carbonate solution, thereby a chlorine atom in the chloromethyl radical is hydrolyzed to form a hydroxyl radical, and 1,1,1-trichloro-5-hydroxypentane (II) is formed. In this reaction, the chloromethyl radical in the compound (I) is reactive to a nucleophilic reagent such as an alkali and is easily subjected to hydrolysis to be changed to a primary alcohol group, while, the trichloromethyl radical is inactive to nucleophilic reagents and remains unreacted. Alternatively, the compound (I) may be heated to reflux with an alkali salt of aliphatic carboxylic acid such as sodium acetate carboxylic acid solution to be once changed to carboxylate of the compound (II) and then hydrolyzed to the compound (II). At any rate, the first step of the process of the invention is effected by conditions known to those skilled in the art for the conversion of chloromethyl radical to hydroxymethyl radical by hydrolysis.

For example, the compound (I) is heated at 150° C. for 5 hrs. in an autoclave with twice the volume of a 10% aqueous sodium carbonate solution under vigorous stirring. From the reaction mixture, after extraction with benzene, 1,1,1-trichloro-5-hydroxypentane (II) is distilled under reduced pressure in a higher yield.

The thus resulting 1,1,1-trichloro-5-hydroxypentane (II) is then converted to δ,δ,δ-trichlorovaleric acid (III) according to the second step of the process of the invention. In this step, the hydroxymethyl radical in the compound (II) is oxidized to form the carboxyl radical. For that purpose, a suitable oxidizing agent and condition to oxidize primary alcohol to carboxyl radical may be employed. Among suitable oxidizing agents are permanganate salts, bichromate salts, anhydrous chromic acid, nitric acid, nitrogen dioxide, and the like.

The methods for oxidizing the compound (II) are similar to those for oxidizing the usual primary hydroxyl group-containing compounds to carboxylic acid-compounds which are well known to organic chemists.

In the third step, the resulting δ,δ,δ-trichlorovaleric acid (III) is heated under anhydrous condition in the presence of a so-called Friedel-Crafts catalyst to be subjected to a dehydrochlorination reaction to form δ,δ-dichloro-4-pentenoic acid (IV). The trichloromethyl radical in the compound (III) is reactive to an electrotrophilic reagent, such as a Friedel-Crafts type catalyst, and is subjected to dehydrochlorination under anhydrous condition to form dichlorovinyl radical. The Friedel-Crafts catalyst may be selected from the following group comprising, aluminum chloride, ferric chloride, tin tetrachloride, boron trifluoride, zinc chloride, bismuth chloride, and the like. Among the above, those having comparatively weak catalytic action, such as zinc chloride and bismuth chloride, furnish a comparatively high yield.

When the compound (III) is heated at a temperature of 140°–150° C. for 4 hrs. with a few percent (by weight) of bismuth chloride the reaction proceeds smoothly to generation of hydrogen chloride gas. From the reaction mixture, δ,δ-dichloro-4-pentenoic acid (IV) is distilled under reduced pressure in a higher yield.

Thus produced δ,δ-dichloro-4-pentenoic acid (IV) is converted to α-chloroglutaric acid (V) according to the fourth step of the process of the invention. Thus, the compound (IV) is subjected to chlorine-addition in an acidic medium by treating with acidic compound and chlorine, whereby the dichlorovinyl radical in the compound (IV) is added with acid and chlorine at its double bond, probably according to the following equations, $$HOOC(CH_2)_2CH{=}CCl_2 + HA + Cl_2 \rightarrow$$
$$HOOC(CH_2)_2CHCl{-}CCl_2A + HCl$$
$$HOOC(CH_2)_2CHCl{-}CCl_2A \xrightarrow{H_2O} HOOC(CH_2)_2CHCl{-}COOH$$

where A represents the acid residue.

In this reaction, phosphoric acid, formic acid, acetic acid or others may be employed instead of sulfuric acid. Among the acidic compounds available for the process of this invention, sulfuric acid, formic acid and acetic acid are found to be preferable.

Upon pouring of the reaction mass into water, preferably in ice water, the addition product is hydrolyzed to carboxychloromethyl radical to yield the compound (V). For example, the compound (IV) is dissolved in concentric sulfuric acid (about three times of its weight) under cooling with ice water. Chlorine gas is passed through this solution at a temperature of 5°–10° C. until the evolution of hydrogen chloride gas ceases (for 2 or 3 hrs.). The reaction product, after hydrolysis with ice-water, is extracted with ether. From the ether extract, α-chloroglutaric acid is crystallized by evaporating the solvent.

As described above, the process of the invention permits the production of α-chloroglutaric acid with a higher yield, starting from 1,1,1,5-tetrachloropentane which is easily synthesized from ethylene and carbon tetrachloride through telomerization, and using low-priced reagents in the four steps comprising hydrolysis, oxidation, de-hydrogen chloride, and chlorine-addition in acidic medium and hydrolysis.

The process of the invention will be described with reference to the following examples, which are set forth merely by way of illustration and not by way of limitation.

Example 1

To 300 ml. of glacial acetic acid, 240 g. of 1,1,1,5-tetrachloropentane and 180 g. of potassium acetate are added, and the mixture is refluxed for 12 hours. The reaction mixture is added with water and extracted with benzene. The benzene extract is washed with water, dried, and distilled to yield 230 g. of a fraction boiling at 94°–97° C./3 mm. Hg (87% yield of the theoretical amount). The fraction is hydrolyzed by mixing with an aqueous methanol solution containing 52 g. of sodium hydroxide under cooling. After neutralization, the reaction mixture is extracted with benzene, and the extract is distilled in vacuo to yield 180 g. of 1,1,1-trichloro-5-hydroxypentane boiling at 76°–78° C./1.5 mm. Hg and having $n_D^{20}$ 1.4873 (the value reported being $n_D^{20}$ 1.4897).

To a solution of 200 g. of potassium permanganate in 2 l. of water kept at 50°–55° C., the above-mentioned product is added drop-wise over about 3 hours, while being stirred. The manganese dioxide formed in the reaction mixture is filtered off, and the filtrate is acidified with hydrochloric acid under cooling. δ,δ,δ-trichlorovaleric acid is precipitated, which weighs 159 g. (83% yield of the theoretical amount) and melts at 65° C.

Thus synthesized δ,δ,δ-trichlorovaleric acid is added with 5 g. of bismuth chloride, and heated at 140°–150° C., thereby hydrogen chloride being generated through dehydrochlorination. After 3 hours reaction, the reaction product is distilled in vacuo to yield 108.5 g. (83% yield of the theoretical amount) of δ,δ,δ-dichloro-4-pentenoic-acid, boiling at 92°–94° C./1 mm. Hg. The acid is mixed with 200 g. of 96% sulfuric acid, and chlorine gas is passed through the mixture under cooling at about 10° C., whereby hydrogen chloride gas is generated and the reaction proceeds. After 3 hours reaction, the product is poured onto ice, and the mixture is extracted with ethyl ether. From the extract, 88 g. (82% of the theoretical amount) of crystalline α-chloroglutaric acid, melting at 97° C., is obtained. The overall yield of α-chloroglutaric acid from 1,1,1,5-tetrachloropentane is 47%.

Example 2

A mixture of 50 g. of δ,δ,δ-trichlorovaleric acid, which is synthesized similarly as in Example 1, and 0.5 g. of anhydrous iron chloride is heated at 90°–100° C. for 2 hours. Twenty grams of δ,δ-dichloro-4-pentenoic acid and 12 grams of unreacted δ,δ,δ-trichlorovaleric acid are obtained. The yield is 65% of the theoretical amount. Similar procedure as in Example 1 yields 14.9 grams (84% yield of the theoretical amount) of α-chloroglutaric acid is obtained.

In each step in the present process of the invention which comprises the steps of hydrolysis, oxidation, dehydrogen chloride, and chlorine addition in acidic solvent and hydrolysis, starting from 1,1,1,5-tetrachloropentane, other reagents and operations than those illustrated in these examples may be employed without deviation from the spirit of the invention. For instance, in deriving 1,1,1-trichloro-5-hydroxypentane from 1,1,1,5-tetrachloropentane through hydrolysis, a method in which 1,1,1,5-tetrachloropentane is directly heated with an alkaline aqueous solution is practicable, besides the method illustrated in Example 1.

Compounds handled in the present invention contain chloromethyl ($ClCH_2$—), trichloromethyl ($Cl_3C$—) and dichlorovinyl ($Cl_2C$=$CH$—) radicals. Regarding chemical reactivities of these radicals, chloromethyl radical is reactive to a nucleophilic reagent but inactive to an electrophilic reagent, while trichloromethyl and dichlorovinyl radicals are inactive to a nucleophilic reagent but reactive to an electrophilic reagent. In view of these facts, it would be obvious to those skilled in the art that there are a number of working embodiments other than those shown in the examples.

Example 3

A mixture of 50 g. of δ,δ,δ-trichlorovaleric acid, which is synthesized similarly as in Example 1, and 2 g. of zinc chloride in 30 ml. of glacial acetic acid is heated at 110°–120° C. for 3 hrs. while being stirred. Thirty-five grams of δ,δ-dichlor-4-pentenoic acid is obtained. The yield is 85% of the theoretical amount. The acid is mixed with 80 g. of pure formic acid, and chlorine gas is passed through the mixture under cooling at about 5° C. After 4 hours' reaction, the product is poured into ice-water, and the mixture is extracted with ethyl ether. From the extract, 28.5 g. (83% of the theoretical amount) of crystalline α-chloroglutaric acid is obtained.

Example 4

Thirty-five grams of δ,δ-dichlor-4-pentenoic acid, which is synthesized as in Example 1, is mixed with 80 g. of glacial acetic acid, and chlorine gas is passed through the mixture under cooling at about 5° C. After 4 hours' reaction, the product is hydrolyzed with ice-water, and the mixture is extracted with ethyl ether. From the extract, 28 g. (81% of the theoretical amount) of crystalline α-chloroglutaric acid is obtained.

What we claim is:

In a process for producing α-chloroglutaric acid by dehydrochlorinating δ,δ,δ-trichlorovaleric acid into δ,δ-dichloro-4-pentenoic acid and synthesizing α-chloroglutaric acid from the δ,δ-dichloro-pentenoic acid, the improvement which comprises mixing δ,δ-dichloro-4-pentenoic acid with an acid selected from the group consisting of sulfuric, phosphoric, acetic, and formic acids, passing a chlorine gas through the resulting mixture at a temperature between 5° C. and 10° C., and pouring the reaction mass into water whereby there is obtained α-chloroglutaric acid.

References Cited by the Examiner

UNITED STATES PATENTS

| | | | |
|---|---|---|---|
| 2,398,430 | 4/46 | Joyce | 260—539 |
| 2,890,241 | 6/59 | Holmen | 260—539 X |

OTHER REFERENCES

Wagner et al.: Synthetic Organic Chemistry, pages 78–80, 102–103, 170, 171, and 418 (1953).

Wagner: Synthetic Organic Chemistry, pp. 106–107 (1953).

LORRAINE A. WEINBERG, *Primary Examiner.*

LEON ZITVER *Examiner.*